April 11, 1961 P. A. FILIPCZAK 2,979,685
SLIP RING ASSEMBLY FOR HIGH VOLTAGES
Filed May 29, 1959 5 Sheets-Sheet 1

INVENTOR.
PETER A. FILIPCZAK
BY
*Harry B. Cook.*
ATTORNEY

April 11, 1961 P. A. FILIPCZAK 2,979,685
SLIP RING ASSEMBLY FOR HIGH VOLTAGES
Filed May 29, 1959 5 Sheets-Sheet 2

INVENTOR.
PETER A. FILIPCZAK
BY
*Harry B. Cook,*
ATTORNEY

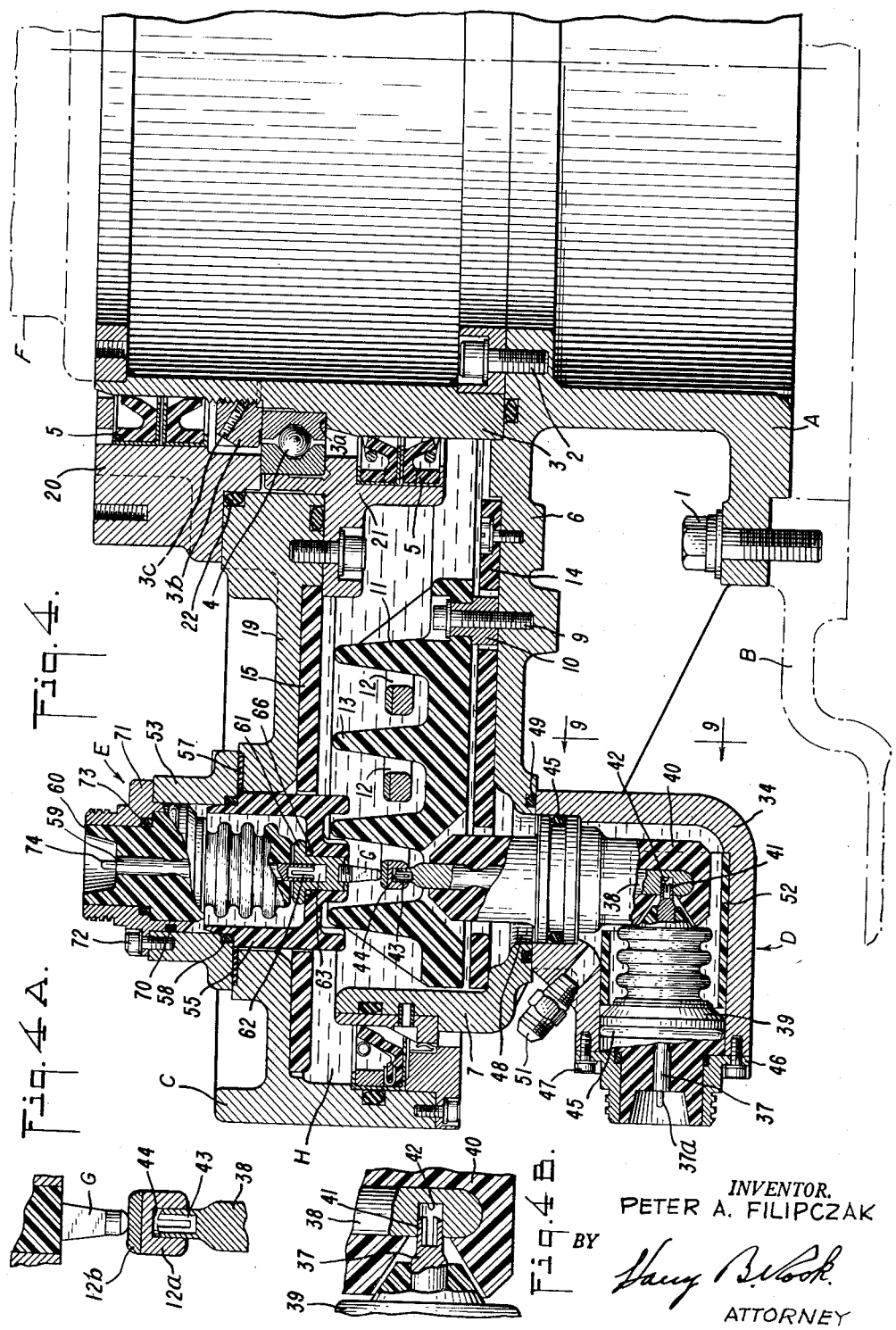

April 11, 1961

P. A. FILIPCZAK 2,979,685

SLIP RING ASSEMBLY FOR HIGH VOLTAGES

Filed May 29, 1959

INVENTOR.
PETER A. FILIPCZAK

BY
Harry B. Cook,
ATTORNEY

April 11, 1961 P. A. FILIPCZAK 2,979,685
SLIP RING ASSEMBLY FOR HIGH VOLTAGES
Filed May 29, 1959 5 Sheets-Sheet 5
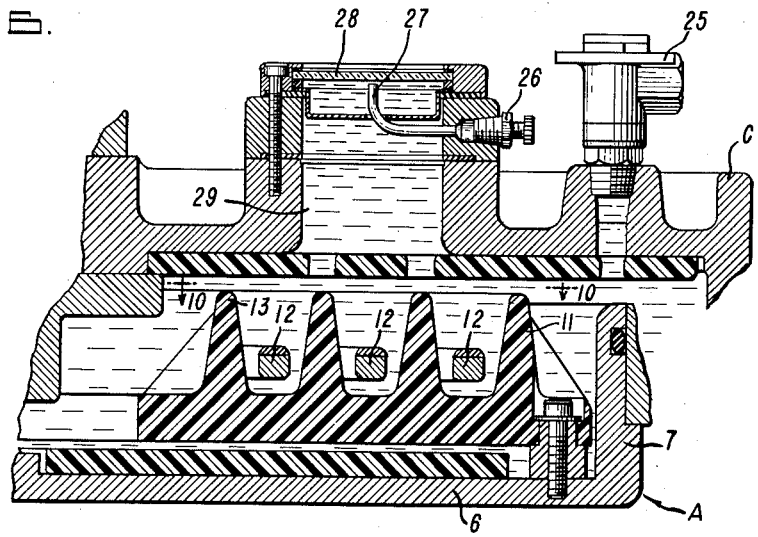
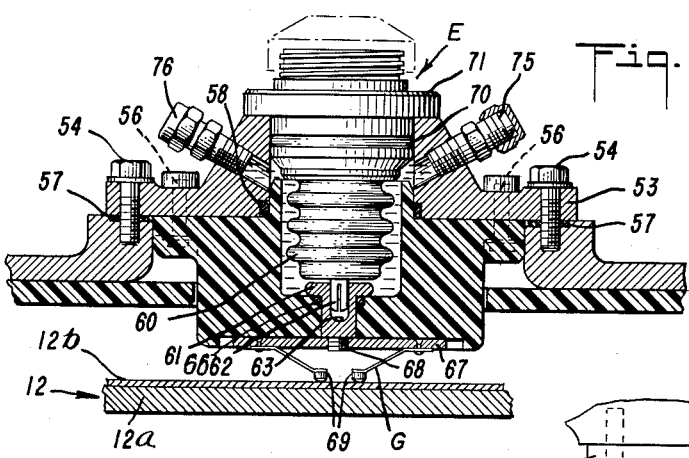
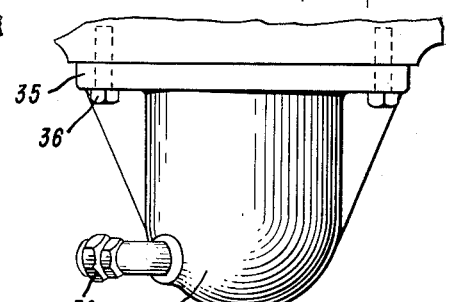
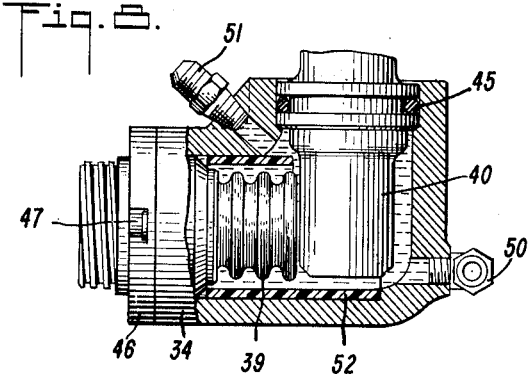
INVENTOR.
PETER A. FILIPCZAK
BY
*Harry B. Cook*
ATTORNEY United States Patent Office 2,979,685
Patented Apr. 11, 1961

2,979,685

SLIP RING ASSEMBLY FOR HIGH VOLTAGES

Peter A. Filipczak, Paramus, N.J., assignor to Electro Tec Corp., South Hackensack, N.J., a corporation of New Jersey Filed May 29, 1959, Ser. No. 816,775

2 Claims. (Cl. 339—5)

This invention relates in general to a slip ring assembly capable of transmitting electricity at high voltages, for example, several thousand volts; and more particularly, the invention contemplates an assembly of the general type that includes a stationary base member on which is rotatably mounted a brush-carrying plate, the brushes of which engage slip rings mounted on a plate of insulating material that is secured to the base member, there being connector elements mounted on the base member for connecting electrical supply lines to the respective slip rings, and there being also connector elements for connecting the brushes and their corresponding slip rings in branch circuits.

One object of the invention is to provide a slip ring assembly of this character which will embody novel and improved features of construction whereby electric current at high voltages may be transmitted through the assembly with a minimum of danger of arcing between the parts and with a maximum of insurance that the electrical connections shall be firm and reliable under all operating conditions.

Another object is to provide in such a slip ring assembly, novel and improved electrical connectors which will permit the easy and quick making and maintenance of reliable electrical connections between the supply lines and the slip rings and between the slip rings and the branch or auxiliary lines.

It is a further object of the invention to provide electrical connectors, each of which comprises a novel and improved construction and combination of parts forming a unit that can be easily and quickly secured to and removed from the base member or the brush-carrying plate, as the case may be, and will enable easy and quick electrical connection of the supply lines and branch lines to the respective slip rings.

Further objects of the invention are to provide a connector which comprises a novel and improved construction and combination of parts for connecting the branch lines to the respective slip rings and for permitting easy and quick inspection and replacement of the brushes; and thus to construct the connector of a plurality of separably connected parts to one of which will be connected the brushes, and which, in turn, will have a frictional telescopic electrical connection with another part to which the corresponding branch line is connected, all of said parts constituting together a unit that can be easily and quickly secured to and removed from the brush-carrying plate to allow ready inspection and replacement of the brushes and the electrical connections.

Another object of the invention is to provide a connector for connecting the main supply lines to the respective slip rings, which comprises a novel construction and combination of parts, which will have a frictional telescopic electrical connection with the corresponding slip ring and will also have a similar electrical connection with another part to which is connected the corresponding main supply wire, said parts together constituting a unit that can be easily and quickly secured to and removed from the base member so that the main supply wire can be connected to and disconnected from the slip ring with a minimum of trouble and care.

It is another object of the invention to provide such a slip ring assembly wherein the connector elements or units can be purged or cleaned, repaired and replaced, without disturbing the assembly as a whole, and the main line wires can be connected to the slip rings and the branch wires and brushes can be connected to the slip rings without disassembly or disturbance of the relation of the base member and the brush-carrying plate.

Other objects of the invention are to provide a slip ring assembly of the character described wherein the parts will be constructed and combined in a novel and improved manner so that all of the zones of electrical contact between the parts will be continuously bathed in oil, thereby to prevent arcing and to reduce the effects of corona; to provide in a slip ring assembly of this type, a novel and improved mounting for the slip rings which will prevent flashing of electric current from one ring to another and from any ring to the metal housing that is comprised of the base member and the brush-carrying plate; and to obtain other advantages and results that will be brought out by the following description in conjunction with the accompanying drawings in which:

Figure 4 is an enlarged fragmentary vertical sectional view approximately on the plane of the line 4—4 of Figure 1;

Figure 4A is a further enlarged fragmentary sectional view of a brush, the corresponding slip ring, and the connection of the slip ring to one of the parts of the main supply wire connector;

Figure 4B is a similar view of the electrical connection between two of the electricity-conducting parts of the main supply wire connector element;

Figure 6 is an enlarged fragmetnary vertical sectional view on the plane of the line 6—6 of Figure 1;

Figure 7 is a fragmentary vertical sectional view approximately on the plane of the line 7—7 of Figure 1 with portions shown in side elevation;

Figure 8 is an enlarged fragmentary vertical sectional view approximately on the plane of the line 8—8 of Figure 3 with the figure turned 180° on the sheet;

Figure 9 is an end elevation of one of the electrical connectors taken from the plane of the line 9—9 of Figure 4.

Figure 2:
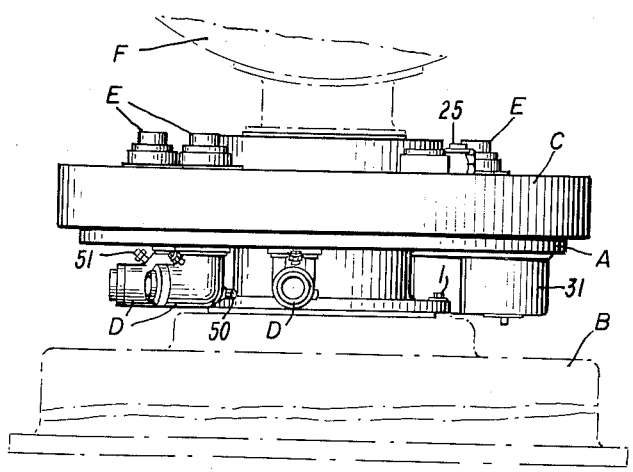
Figure 2 is a side elevation of the assembly, illustrated on a reduced scale and with portions broken away.

Specifically describing the illustrated embodiment of the invention and with particular reference to Figures 2 and 4, the reference character A designates the base member of the slip ring assembly that is shown as rigidly mounted on a suitable support or pedestal B and has rotatably mounted thereon the brush-carrying plate C so that electrical current can be conducted through main line connectors D to corresponding slip rings and thus through brushes and branch line connectors E to branch circuits in any desired apparatus F, that appears in Figure 2 and, for the purpose of illustration, is shown as mounted on a portion of the base member that projects above the brush-carrying plate.

The base member is shown as comprising a casting secured by cap screws 1 to the support or pedestal B and having separably mounted thereon and coaxial therewith by means of cap screws 2, a bearing post 3 on which the brush-carrying plate is mounted by means of ball bearings 4, rubber sealing rings 5 being provided at opposite sides of the bearing 4 between the inner periphery of the plate C and the bearing post.

Figure 5:
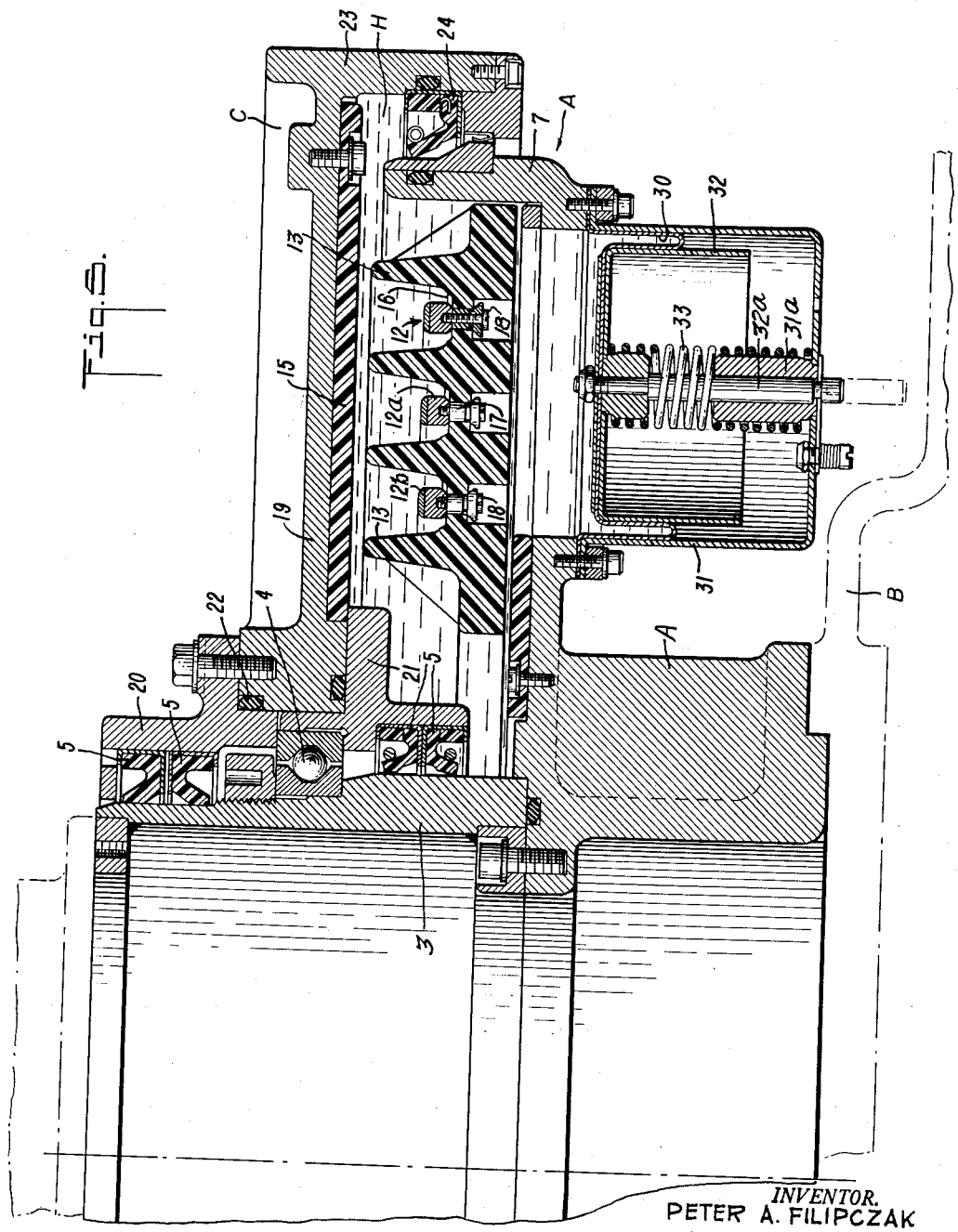
Figure 5 is a view similar to Figure 4 on the plane of the line 5—5 of Figure 1.

The base member A has a circular plate-like portion 6 that extends outwardly beyond the bearing post 3 and coaxial therewith, and a coaxial flange 7 projects upwardly from the plate portion 6. Mounted on the plate portion 6 between the bearing post 3 and the flange 7 by suitable means such as cap screws 9 and spacing sleeves 10, is a mounting plate 11 of insulating material for the several circular slip rings 12, said mounting plate having a plurality of outwardly projecting integral coaxial fins 13 between two adjacent ones of which is arranged one of the slip rings 12. Preferably, rings 14 and 15 are interposed between the mounting plate 11 and the base member and brush-carrying plate C, respectively, so that flashing or arcing of electricity from the slip rings to each other or to the metal base member and metal brush-carrying plate will be prevented. The slip rings may be constructed and secured on the mounting plate 11 in substantially the same manner in which the slip rings are described as made and mounted in my co-pending application Serial No. 733,620, filed May 7, 1958, the mounting plate preferably having portions cut away between the fins to provide circumferentially spaced seats 16 (Fig. 5) for the rings and spaces between said seats to permit oil to circulate around the slip rings. The slip rings may be secured on the mounting plate in any suitable manner, but as best shown in Figure 5, sleeves 17 are mounted in openings in the seats 16 and cap screws 18 pass through the sleeves and are screwed into the corresponding slip rings. Each slip ring preferably has a heavy metal body portion 12a of brass or the like and a slip layer 12b, preferably a silver alloy, electro-deposited on the body portion 12a with which slidingly contacts a brush G carried by the connector unit E on the brush-carrying member C.

The brush-carrying member C is circular, having a plate-like portion 19 at opposite sides of which on its inner periphery are secured circular bearing flanges 20 and 21, respectively, in the former of which are mounted the sealing rings 5 and in the latter of which is mounted the ball bearing that is secured on the bearing post 3 between a shoulder 3a and a locking ring 3b which is screw-threadedly adjustable on the post and held in locked position by a set screw 3c. Thus the member C is stably journaled and held against axial movement on the bearing post 3. Preferably, rubber O-rings 22 are interposed between the plate portion 19 and the flanges 20 and 21 to prevent leakage of oil from the space between the base member and the member C, and the plate portion 19 has a coaxial perimetrical flange 23 between which and the flange 7 of the base member is an oil seal 24 of known construction.

The chamber H formed between the base member A and the brush-carrying member C is filled with oil to dampen arcing of the contacts between the brushes and the slip rings, and the oil is maintained under moderate pressure. Referring to Figure 6, the brush-carrying element has a fitting 25 for filling the chamber with oil, and, preferably, an air bleeder valve 26 is provided for permitting the escape of air during the filling operation. As shown, this vent valve has an upwardly facing tube 27 in closely spaced relation to a sight glass 28 that closes a sight opening 29 in the brush-carrying member, and with this construction, the flow of oil into the chamber can be observed and the air can be vented from the chamber until the chamber has been completely filled. The oil is injected under pressure which, after the filling operation has been completed, is maintained by an oil accumulator including a casing 31 which is secured to the underside of the body member A (Figure 5), and opens into the chamber H, and in which is a flexible diaphragm 30 supported by a piston 32 that is guided by a rod 32a in a bearing 31a and is normally biased by a spring 33 to allow for contraction and expansion of the oil. As above described, means are provided for maintaining the chamber liquid-tight, said means including the seals 5 and 24 and liquid-tight connections of the connector elements D and E to the base member and brush-carrying element, respectively.

Figure 3:
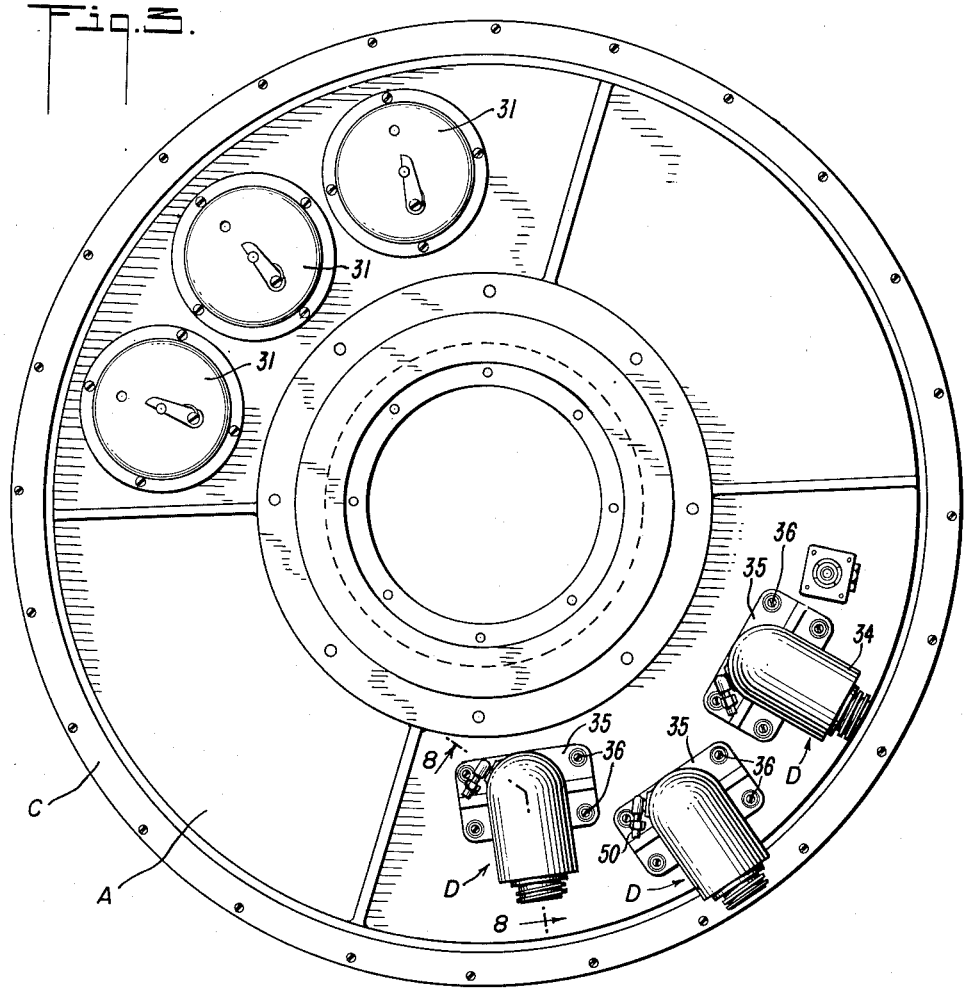
Figure 3 is a bottom plan view of the assembly.
Figure 10:
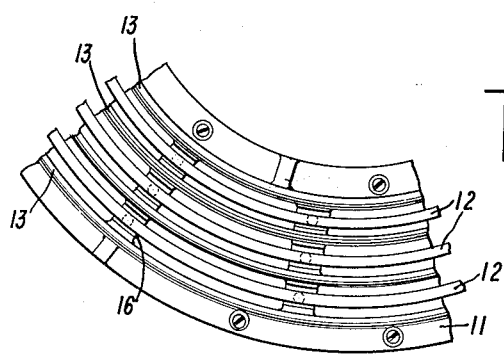
Figure 10 is a fragmentary plan view, on a reduced scale, of the slip rings and their mounting plate, taken approximately from the plane of the line 10—10 of Figure 6.

As hereinbefore pointed out, an important feature of the invention is connector units for connecting wires of an electric circuit to the slip rings and to the brushes. First describing the connector unit D for connecting the main wire to the respective slip rings, each of these units is shown as comprising a casing 34 that, in the present instance, is in the form of an elbow at one end of which are flanges 35 by which the elbow is secured to the base member with cap screws 36 (Figure 3). Extending through the casing 34 is a conductor that is shown as including two separably connected sections 37 and 38 that are embedded in the respective blocks of insulation 39 and 40. One end of the section 37 projects from the insulating block 39 for connection to a circuit wire as indicated at 37a, while the other end of the conductor section has a separable telescopic connection with one end portion of the conductor section 38. As shown, the section 37 has a plurality of integral spring fingers 41 that frictionally telescopically fit into a socket 42 in the section 38 (Figure 4B), the two sections being thus connected at right angles to each other with one disposed in each of the arms of the elbow casing. The other end of the section 38 has a plurality of similar spring fingers 43 that frictionally telescopically fit into a socket 44 in the corresponding slip ring (Figure 4A). Each of the insulating blocks 39 and 40 has a liquid-tight fit in one arm of the elbow casing 34 as by means of a rubber O-ring 45. The parts are assembled by first inserting the insulating block 40 and the conductor section 38 into one arm of the casing and then slipping the insulating block 39 and the connector section 37 into the other arm of the casing, at the same time causing the pins 41 to enter the socket 42 (Figures 4 and 4B). The connector assembly is held in this casing by cap screws 47. The connector unit is then applied to the base member by a slipping portion of the insulating block 40 that projects beyond the casing through an opening 48 in the base member with a sealing ring 49 between the end of the casing and the base member, at the same time causing the fingers 43 to enter the socket 44 (Figures 4 and 4A), after which the casing is secured to the base member by the cap screws 36. The casing 34 is filled with oil by forcing oil into the casing through a fitting 50 while venting air from the casing through a valve fitting 51.

It will thus be seen that the connections 43, 44 between the conductors and the slip rings, and the connections 41, 42 between the conductor sections 37 and 38 will be immersed or bathed in oil so as to prevent any arcing, the sealing ring 49 providing a liquid-tight joint between the casing and the base member and the sealing rings 45 sealing the oil within the casing 34. Preferably, a sleeve of insulation 52 is inserted into the casing around the zone of the connections 41, 42 to prevent flashing from the electrodes to the casing.

Figure 1:
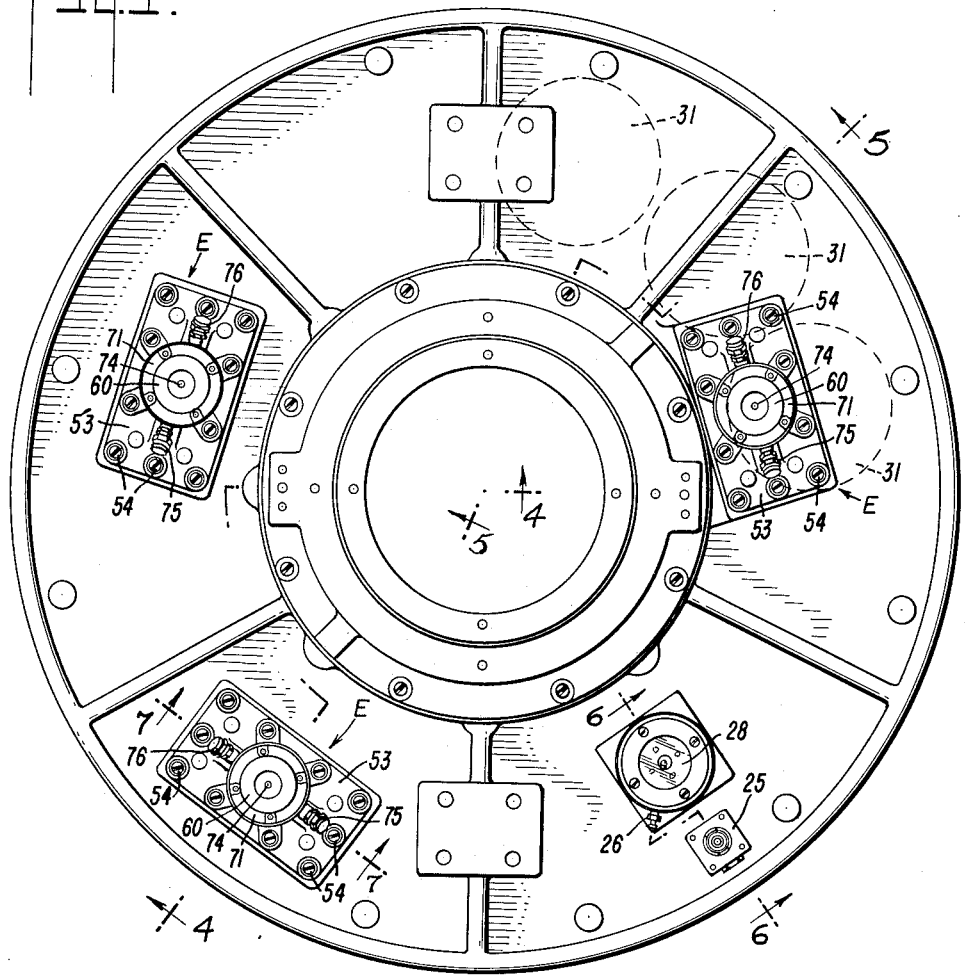
Figure 1 is a top plan view of a slip ring assembly embodying the invention.

Each of the connector units E for the brushes is shown as comprising a casing separably secured with a liquid-tight joint to the brush-carrying member and having a conductor including two separably connected sections in insulated relation to the casing to one of which is connected the corresponding brush G. As shown, the casing includes a flanged body section 53 that is secured on the brush-carrying member by cap screws 54 (Figures 1 and 7), and a second section 55 is separably secured to the first section by bolts 56. The body section 53 has a liquid-tight joint with the brush-carrying member by a gasket 57, while the section 55 has a liquid-tight connection with the section 53 through a sealing ring 58. A conductor extends through the casing and includes a section 59 mounted in an insulating block 60, and a second section 61 that is mounted in the casing section 55 which is shown as formed of insulating material. The two sections are separably connected together, one end of the section 59 being shown as provided with spring fingers 62 that are telescopically frictionally fitted into a socket 63 in the section 61. The conductor section 61 has a liquid-tight connection to the casing section 55 by a sealing ring 66 and has one end projecting from the casing section 55 with the brush element G connected thereto (Figure 7). As shown, the brush element includes a plate 67 having a screw-threaded connection 68 with the conductor section and also having a pair of spring brushes 69 mounted thereon and in sliding contact with the slip surface 12b of the corresponding slip ring 12. The insulating block 60 has a liquid-tight connection with the casing body 53 by a sealing ring 70 and is held in the body section by a clamp ring 71 that is secured to the body section by cap screws 72, there being preferably a sealing ring 73 between the clamp plate and the insulating block.

In assembling the parts, the conductor section 61 is fitted into the opening in the casing section 55, after which the brush element G is secured thereto. The two casing sections are then secured together and the connector assembly comprised of parts 59, 60, and 71 is slipped into the casing while at the same time the pin 62 is fitted into the socket 63. The outer end of the conductor section 59 is formed for connection to a circuit wire as indicated at 74.

The casing 53, 55, is filled with oil through a filling fitting 75 while air is exhausted from the chamber between the two sections of the casing through a valve vent fitting 76 (Figure 7).

With this construction, it will be observed that the connector elements D and E can be easily and quickly applied to and removed from the respective base member and brush-carrying plate without disturbing the other parts of the assembly except the removal and replacement of the oil from and in the chamber H. Thus the brushes and the slip rings can be easily and quickly inspected and replaced or repaired. Also, the connector elements E and D can be easily and quickly assembled and disassembled for purging thereof or for inspection, repair, and replacement of one or more of the parts; and the main line wires and branch wires and brushes can be connected to the slip rings without disassembly or disturbance of the relation of the base member and the brush-carrying plate, and at the same time making and maintenance of reliable electrical connections between the wires and the slip rings shall be expedited.

While for the purpose of illustrating the principles of the invention, the slip ring is shown as embodying the now preferred structural details, it should be understood by those skilled in the art that the specific construction of the parts and the combination thereof may be modified and changed within the spirit and scope of the invention.

I claim:

1. A slip ring assembly including a base member and a brush-carrying member associated for relative rotation about a common axis and providing a chamber therebetween, at least one slip ring mounted in said chamber, on said base member, and at least one brush, a connector unit including a casing on one end of which said brush is mounted and having a conductor in insulated relation thereto having one end connected to said brush while the other end is for connection to a wire, said casing including a plurality of separably connected sections and said conductor comprising at least two separate parts each in one of said casing sections and telescopically separably connected to the other part, said brush-carrying member having an opening and there being means for separably connecting said casing to said brush-carrying member exteriorly thereof with a portion thereof extending through said opening and with said brush in sliding contact with said slip ring, and a second connector unit including a casing having a conductor in insulated relation thereto for connection at one end to a wire, the other end of said conductor and said slip ring having telescopically separably connected portions, said casing of the second connector unit including a plurality of sections and said conductor comprising at least two separate parts each in one of said casing sections and telescopically separably connected to the other part, said base member having an opening and there being means for separably connecting said casing of the second connector unit to said base member with a portion thereof extending through said opening in the base member and with the second-mentioned end of the conductor separably connected to said slip ring.

2. A slip ring assembly as defined in claim 1 wherein said sections of each of said connector units are separably connected with a liquid-tight joint and provide a chamber between them which is filled with oil surrounding the telescopic connections between the parts of the corresponding conductors.

References Cited in the file of this patent
UNITED STATES PATENTS

| | | |
|---|---|---|
| 2,379,226 | Frey | June 26, 1945 |
| 2,395,899 | Morrow et al. | Mar. 5, 1946 |
| 2,396,871 | Meyerhans | Mar. 19, 1946 |
| 2,424,545 | Bard | July 29, 1947 |
| 2,575,409 | Cooper et al. | Nov. 20, 1951 |